United States Patent
Law et al.

(10) Patent No.: US 6,391,973 B1
(45) Date of Patent: May 21, 2002

(54) CURABLE COATING COMPOSITION WITH IMPROVED STABILITY

(75) Inventors: David Law, Livonia; Walter H Ohrbom, Hartland Township; S. Kendall Scott, Dearborn; Sergio E. Balatan, West Bloomfield; Thomas E. St. Henry, Anne Arbor; Robert Weise, Harper Woods, all of MI (US)

(73) Assignee: BASF Corporation, Southfield, MI (US)

( * ) Notice: Subject to any disclaimer, the term of this patent is extended or adjusted under 35 U.S.C. 154(b) by 0 days.

(21) Appl. No.: 09/624,566

(22) Filed: Jul. 24, 2000

(51) Int. Cl.⁷ .................. C08L 23/00; C08L 23/04; B05D 1/36
(52) U.S. Cl. .............. 525/191; 525/222; 525/225; 525/227; 525/232; 525/240; 525/241; 427/407.1
(58) Field of Search .................... 525/191, 222, 525/225, 227, 232, 240, 241; 427/407.1

(56) References Cited

U.S. PATENT DOCUMENTS

| | | | |
|---|---|---|---|
| 4,139,437 A | * | 2/1979 | Araki et al. .......... 522/4 |
| 4,490,417 A | | 12/1984 | Shindow |
| 4,539,363 A | | 9/1985 | Backhouse |
| 4,876,313 A | | 10/1989 | Lorah |
| 4,894,397 A | | 1/1990 | Morgan et al. |
| 4,916,171 A | | 4/1990 | Brown et al. |
| 4,959,417 A | | 9/1990 | Miyazono et al. |
| 4,978,695 A | | 12/1990 | Hoshino et al. |
| 5,118,749 A | | 6/1992 | Knutson |
| 5,185,387 A | | 2/1993 | Klesse et al. |
| 5,212,251 A | | 5/1993 | Lorah et al. |
| 5,219,900 A | | 6/1993 | Davies et al. |
| 5,266,361 A | | 11/1993 | Schwarte et al. |
| 5,322,865 A | | 6/1994 | Inoue et al. |
| 5,328,952 A | * | 7/1994 | Brodnyan et al. .......... 525/301 |
| 5,405,879 A | | 4/1995 | Uemae et al. |
| 5,569,715 A | | 10/1996 | Grandhee |
| 5,786,420 A | | 7/1998 | Grandhee |
| 5,969,030 A | | 10/1999 | Grandhee |
| 6,013,324 A | | 1/2000 | Frangou et al. |

* cited by examiner

*Primary Examiner*—Nathan M. Nutter
(74) *Attorney, Agent, or Firm*—Anne M. Budde

(57) ABSTRACT

The present invention provides a coating composition containing a two-stage polymer emulsion. The two-stage emulsion polymer contains composite polymeric particles of a first stage polymer prepared from about 0.25% to about 5% by weight monomer having at least two polymerizable ethylenically unsaturated groups, about 2.5% to about 10% by weight hydroxyl monomer, preferably at least about 50% by weight of non-functional monomer of hydrophobic monomer, and preferably without addition of any acid-functional monomer; and a second stage polymer having a theoretical glass transition temperature of at least about 50° C. prepared using, by weight, about 25% to about 50% by weight hydroxyl monomer, about 3% to about 9% carboxylic acid monomer, and preferably at least 25% by weight of non-functional monomer of hydrophobic monomer;. The composite polymeric particles have a theoretical glass transition temperature of not more than about 30° C., preferably not more than about 0° C., and include from about 0.8% to about 2% by weight of carboxylic acid monomer.

21 Claims, No Drawings

CURABLE COATING COMPOSITION WITH IMPROVED STABILITY

FIELD OF THE INVENTION

This invention concerns curable coating compositions, especially compositions for high-gloss topcoats, particularly for clearcoats of color-plus-clear composite coatings.

BACKGROUND OF THE INVENTION

Curable, or thermosettable, coating compositions are widely used in the coatings art, particularly for topcoats in the automotive and industrial coatings industry. Basecoat-clearcoat composite coatings are particularly useful as topcoats for which exceptional gloss, depth of color, distinctness of image, or special metallic effects are desired. The automotive industry has made extensive use of these coatings for automotive body panels.

Aqueous coating compositions and powder coating compositions have been increasingly used to meet legal restrictions on organic solvent emissions. In recent years, waterborne basecoat compositions, in particular, have gained prominence. Waterborne basecoat compositions have been prepared by different methods. One method to prepare the basecoat is by emulsion polymerizing an acrylic polymer and combining the emulsion polymer with other materials, such as pigments and a crosslinker. while emulsion polymerization provides advantages, the basecoats have been found to have viscosity instability. Metallic basecoat colors in particular depend highly on maintaining a stable viscosity over the life of the product to achieve the control of the metal flake pigment and/or pearlescent flake pigment need to achieve the desired lustrous color effect.

The basecoat, as integral layer of a composite coating on a substrate, must also aid in providing the excellent resistance to chipping required of automotive coatings. Further, the basecoat must have excellent adhesion to the any underlying primer layer, as well as to the clearcoat applied over the basecoat, so that the composite coating is strong. Likewise, the applied basecoat compositions must not cause pinholing or popping of the topcoat because such defects cause poor coating performance as well as resulting in poor appearance. Recent interest in aqueous powder slurry clearcoats has introduced a new compatibility requirement for basecoat compositions. Known basecoat compositions have produced a "mudcracking" appearance when used with powder slurry waterborne clearcoats.

An improved aqueous coating composition was thus needed to addresses these various problems of basecoat compositions.

SUMMARY OF THE INVENTION

The coating composition of the invention includes an aqueous two-stage polymer emulsion. The two-stage emulsion polymer contains composite polymeric particles of a first stage polymer and a second stage polymer. The composite polymeric particles have a theoretical glass transition temperature of not more than about 30° C. and from about 0.8% to about 2% by weight, based on the total weight of monomers polymerized in the first stage and second stages, of at least one monomer having carboxylic acid functionality.

The first stage polymer has an acid content of no more than about 0.5% by weight, based on total weight of monomers polymerized in the first stage, of a carboxylic acid functional monomer. Preferably, the first stage polymer is prepared by polymerizing a combination of addition monomers that does not include a carboxylic acid-functional monomer, by which it is meant that no carboxylic acid-functional monomer is intentionally added, although some carboxylic-acid functional monomer may be present as an impurity in one or more of the monomers of the combination. The combination of addition monomers includes from about 0.25% to about 5% by weight, based on the total weight of monomers polymerized in the first stage, of at least one monomer having at least two polymerizable ethylenically unsaturated groups and from about 2.5% to about 10% by weight, based on the total weight of monomers polymerized in the first stage, of at least one monomer having hydroxyl functionality. The first stage combination of addition monomers preferably also includes at least about 50% by weight, based on the total weight of monomers polymerized in the first stage that have no functional group other than the polymerizable ethylenically unsaturated group, of at least one hydrophobic monomer. "Hydrophobic monomer," in connection with the present invention, refers to a monomer that is either an aromatic vinyl monomer or is a monomer having the structure

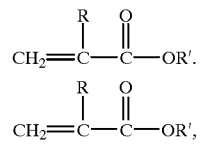

in which R is H or a methyl group and R' is an alkyl group (including cycloalkyl group) having at least four carbons.

The second stage polymer has a theoretical glass transition temperature of at least about 50° C. and is prepared by polymerizing, in the presence of the first stage polymer emulsion, a combination of addition monomers that is preferably substantially free of monomers having more than one polymerizable ethylenically unsaturated group. The combination of addition monomers of the second stage polymer includes from about 25% to about 50% by weight of at least one hydroxyl-functional monomer and from about 3% to about 9% by weight of at least one carboxylic acid-functional monomer, each percentage being based on the total weight of monomers polymerized in the second stage. The combination of addition monomers of the second stage preferably also includes at least about 25% by weight of at least one hydrophobic monomer having no functional group other than the polymerizable ethylenically unsaturated group, based on the total weight of monomers polymerized in the second stage.

The invention further provides an article having a surface coated with a coating derived from the coating composition of the invention, particularly a composite coating having a basecoat layer and a clearcoat layer, and a method of producing such a coating on a substrate, particularly as a basecoat/clearcoat composite coating, with the coating composition of the invention being at least the basecoat of the composite coating. The method of the invention particularly provides preparing a basecoat layer from the coating composition of the invention and a clearcoat layer from an aqueous powder slurry coating composition and the composite coating produced by the method.

The coating composition of the invention provides improved viscosity stability. In particular, the present coating composition provides more stable metal control characteristics in a metallic basecoat coating composition compared to previous coating compositions based on two-stage emulsion polymers. Further, the particular combination of monomers used to prepare the two-stage emulsion polymer provides excellent chip and adhesion results while avoiding pinholing and popping problems in a basecoat/clearcoat composite coating. It has also been discovered that, while previous basecoat compositions produced a "mudcracking" appearance when used with aqueous powder slurry clearcoat compositions, the basecoat of the present invention avoids the problem of mudcracking and provides a composite coating with an excellent appearance.

DETAILED DESCRIPTION OF THE INVENTION

The two-stage emulsion polymer of the coating composition contains composite polymeric particles produced by emulsion polymerization of a first stage polymer followed by emulsion polymerization of a second stage polymer in the presence of the first stage polymer. A two-stage emulsion polymer produced in this way has properties that are different from either a blend of separate emulsion of the first stage and second stage polymers or a two-stage emulsion polymer in which the order of polymerization of the first stage and second stage polymers is reversed.

The composite polymeric particles of the emulsion polymer have a theoretical glass transition temperature of not more than about 30° C., and preferably no more than about 25° C. In a more preferred embodiment, the composite polymeric particles of the emulsion polymer have a theoretical glass transition temperature of not more than about 0° C. The composite coating in which the basecoat is derived from the coating composition of the invention has excellent result in chip testing, such as automotive coating gravelometer testing and shot chip testing. The composite polymeric particles of the emulsion polymer have a theoretical glass transition temperature of at least about −30° C., preferably at least about −25° C., more preferably at least about −20° C. The composite polymeric particles of the emulsion polymer have a theoretical glass transition temperature in a preferred range of from about −30° C. to about 30° C, a more preferred range of from about −25° C. to about 25° C., and a still more preferred range of from about −25° C. to about 0° C. Theoretical glass transition temperatures may be calculated from glass transition temperatures of homopolymers of the monomers polymerized according to the well-known Fox equation in which the reciprocal of the glass transition temperature (in degrees Kelvin) of the copolymer is the summation of the reciprocal of the glass transition temperature (in degrees Kelvin) for a homopolymer of each monomer multiplied by the weight fraction of that monomer in the copolymer. Other methods are also known for deriving theoretical glass transition temperatures and may be used, such as determining the maximum of a curve of measured glass transition temperatures for polymers of the same monomer compositions and different molecular weights.

The composite polymeric particles of the emulsion polymer also have from at least about 0.8% by weight, preferably at least about 1% by weight, and up to about 2% by weight, preferably up to about 1.5% by weight, of at least one monomer having carboxylic acid functionality, based on the total weight of monomers polymerized in the first stage and second stages. When the composite polymeric particles have less than about 0.8% by weight of carboxylic acid-functional monomer, an increased amount of coagulum is produced during the polymerization process. In addition, when the composite polymeric particles have less than about 0.8% by weight of carboxylic acid-functional monomer, a coating composition prepared from the emulsion polymer experiences viscosity changes that are unacceptable, particularly in the case of the so-called metallic colors. Metallic color coating compositions include special effect flake pigments (e.g., metallic and pearlescent pigments), for which viscosity increases result in poorer metallic appearance of the coating produced therefrom. On the other hand, coating compositions prepared from emulsion polymers in which the composite polymeric particles have more than about 2% by weight of carboxylic acid-functional monomer also experience unacceptable viscosity changes, producing metallic basecoat compositions for which the viscosity changes result in unacceptably dark metallic appearances. The composite polymeric particles preferably have from about 1% by weight to about 1.5% by weight of at least one monomer having carboxylic acid functionality, based on the total weight of monomers polymerized in the first stage and second stages.

Examples of suitable monomers having carboxylic acid functionality include, without limitation, acrylic acid, methacrylic acid, maleic acid, crotonic acid, itaconic acid, fumaric acid, and vinylacetic acid, monoesters of polymerizable diacids, and combinations of these. The corresponding anhydrides can be used in place of or in addition to the acid, and the acid will be generated when the anhydride monomer is introduced into the aqueous medium during polymerization.

The composite polymeric particles have a first stage polymer and a second stage polymer. The first stage polymer has no more than about 0.5% by weight of acid-functional monomer, preferably no more than about 0.2% by weight of acid-functional monomer, and more preferably no more than about 0.1% by weight of acid-functional monomer, based on the total weight of monomers polymerized in the first stage. Preferably, the first stage polymer is prepared by polymerizing a combination of addition monomers in which no carboxylic acid-functional monomer is intentionally added, although some carboxylic-acid functional monomer may be present as an impurity in one or more of the other monomers of the combination. If the first stage polymer has more than about 0.5% acid-functional monomer, then the coating composition containing the two-stage polymer emulsion exhibit unstable, increasing viscosity. Increasing viscosity is particularly unacceptable in metallic coating compositions because the metallic appearance of the coating produced from the coating composition becomes unacceptable.

The addition monomers polymerized in the first stage include at least about 0.25% by weight, preferably at least about 0.5% by weight, more preferably at least about 1% by weight of at least one monomer having at least two polymerizable, ethylenically unsaturated groups. Further, the monomers of the first stage include up to about 5% by weight, preferably up to about 4% by weight, more preferably up to about 3.5% by weight of the at least one monomer having at least two ethylenically unsaturated, polymerizable groups. Preferred ranges for the monomer or monomers having at least two ethylenically unsaturated groups are from about 0.25% to about 5% by weight, particularly from about 0.5% to about 4% by weight, and especially from about 0.5% to about 3.5% by weight, based on total weight of first stage monomers. When the first stage monomers include less than about 0.25% by weight of at least one monomer having at least two ethylenically unsaturated groups, then the coatings produced with the two-stage polymer emulsion have poor adhesion and poor chip properties (e.g., in gravelometer or shot chip testing). When the first stage monomers include more than about 5% by weight of at least one monomer having at least two ethylenically unsaturated groups, then the coatings produced with the two-stage polymer emulsion have unacceptable pinholing and popping.

Examples of suitable monomers having at least two polymerizable unsaturated groups include, without limitation, 1,4-butanediol diacrylate, 1,4-butanediol dimethacrylate, 1,6-hexanediol diacrylate, 1,6-hexanediol dimethacrylate, ethylene glycol diacrylate, ethylene glycol dimethacrylate, 1,3-propanediol diacrylate, 1,3-propanediol dimethacrylate, propylene glycol diacrylate, propylene glycol dimethacrylate, butylene glycol diacrylate, butylene glycol dimethacrylate, cyclohexane dimethanol diacrylate, cyclohexane dimethanol dimethacrylate, neopentyl glycol diacrylate, neopentyl glycol dimethacrylate, allyl acrylate, allyl methacrylate, butenyl acrylate, butenyl methacrylate, undecenyl acrylate, undecenyl methacrylate, vinyl acrylate, vinyl methacrylate, butadiene, isoprene, divinylbenzene, the methacrylic acid ester of ethylene glycol monodicyclopentenyl ether, and combinations of these.

The addition monomers polymerized in the first stage include at least about 2.5% by weight, preferably at least about 3% by weight, more preferably at least about 4% by weight of at least one monomer having hydroxyl functionality. Further, the monomers of the first stage include up to about 10% by weight, preferably up to about 8% by weight, more preferably up to about 7% by weight of the at least one monomer having hydroxyl functionality. Preferred ranges for the monomer or monomers having hydroxyl functionality are from about 2.5% to about 10% by weight, particularly from about 3% to about 8% by weight, and especially from about 4% to about 7% by weight, based on total weight of first stage monomers. When the monomers of the first stage have less than about 2.5% by weight of at least one monomer having hydroxyl functionality, the coating produced using the two-stage polymer emulsion have poor adhesion and poor chip properties. When the monomers of the first stage have more than about 10% by weight of at least one monomer having hydroxyl functionality, the coating composition containing the two-stage polymer emulsion exhibit unstable, increasing viscosity that results in a need to reduce nonvolatile content to achieve spray viscosity, as well as unacceptable metallic appearance of the coating produced from the coating composition. Examples of suitable monomers having hydroxyl functionality include, without limitation, hydroxyethyl acrylate, hydroxyethyl methacrylate, hydroxypropyl acrylate, hydroxypropyl methacrylate, hydroxybutyl acrylate, hydroxypropyl methacrylate, and combinations of these.

The combination of addition monomers polymerized in the first stage also preferably includes at least about 50% by weight, more preferably at least about 60% by weight, based on the total weight of the first stage monomers having no functional group other than the polymerizable ethylenically unsaturated group, of at least one hydrophobic monomer. If the first stage monomers contain less than about 50% by weight of at least one hydrophobic monomer, based on the weight of first stage monomers having no functional group other than the polymerizable ethylenically unsaturated group, then the resistance to humidity blistering of the coating produced using the two-stage emulsion polymer may decrease.

As hydrophobic monomers, the monomers polymerized in the first stage includes one or more aromatic vinyl monomers and/or one or more monomers having the structure

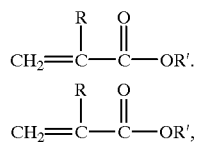

in which R is H or a methyl group, and R' is an alkyl group (including cycloalkyl groups) having at least four carbons, preferably having from four to about twelve carbons. Preferably R' is a butyl, isobutyl, sec-butyl, pentyl, neopentyl, hexyl, 2-ethylhexyl, n-octyl, cyclohexyl, or isobornyl radical. Examples of suitable aromatic vinyl monomers include, without limitation, styrene, α-methyl styrene, dimethyl styrene, vinyl toluene, tert-butyl styrene, and combinations of these. Examples of suitable hydrophobic acrylate and methacrylate monomers include, without limitation, n-butyl acrylate, n-butyl methacrylate, isobutyl acrylate, isobutyl methacrylate, n-hexyl acrylate, n-hexyl methacrylate, n-octyl acrylate, n-octyl methacrylate, 2-ethylhexyl acrylate, 2-ethylhexyl methacrylate, decyl acrylate, decyl methacrylate, lauryl acrylate, lauryl methacrylate, stearyl acrylate, stearyl methacrylate, cyclohexyl acrylate, cyclohexyl methacrylate, isobornyl acrylate, isobornyl methacrylate, benzyl acrylate, benzyl methacrylate, and combinations of these. Styrene, butyl acrylate, butyl methacrylate, 2-ethylhexyl acrylate, 2-ethylhexyl methacrylate, cyclohexyl acrylate, and cyclohexyl methacrylate, and combinations of these.

The second stage polymer has a theoretical glass transition temperature of at least about 50° C. When the theoretical glass transition temperature of the second stage polymer is less than about 50° C., the viscosity stability of the two-stage emulsion and the coating produced from the two-stage emulsion is adversely affected and can increase substantially over time. As mentioned before, when the viscosity increases, especially in a metallic paint, the coating appearance becomes unacceptable and/or the solid content of the coating composition must be reduced to achieve application viscosity. In a preferred embodiment the second stage polymer has a theoretical glass transition temperature of at least about 60° C., more preferably at least about 75° C. The theoretical glass transition temperature of the second stage polymer may be higher, but glass transition temperatures of no more than about 100° C. are preferred, and no more than about 90° C. are particularly preferred. The theoretical glass transition temperature is preferably in the range of from about 60° C. to about 90° C., more preferably from about 75° C. to about 85° C.

The combination of addition monomers polymerized in the second stage is preferably substantially free of monomers having more than one polymerizable ethylenically unsaturated group. By "substantially free" is meant that no more than about 0.1 by weight, preferably no more than about 0.05% by weight, and preferably none of the second stage addition monomers may have more than one polymerizable ethylenically unsaturated group.

The combination of addition monomers polymerized in the second stage includes at least about 25% by weight, preferably at least about 30% by weight, of at least one monomer having hydroxyl functionality. Further, the monomers of the second stage include up to about 50% by weight, preferably up to about 45% by weight, of the at least one monomer having hydroxyl functionality. The monomer or monomers having hydroxyl functionality are preferably included in amounts in the range of from about 25% to about 50% by weight, particularly from about 30% to about 45% by weight, based on total weight of second stage monomers. When less than about 25% by weight of hydroxyl monomer is included in the second stage monomer combination, the two-stage polymer emulsion and coating composition containing it are unstable, and the coating derived from the coating composition has poor adhesion and chip properties. When more than about 50% by weight of hydroxyl monomer is included in the second stage monomer combination, the two-stage polymer emulsion may be unstable during polymerization and no stable product may be obtained. Examples of suitable monomers having hydroxyl functionality include, without limitation, those hydroxyl-functional monomers mentioned above in connection with the first stage monomers.

The combination of addition monomers polymerized in the second stage also includes at least about 3% by weight, preferably at least about 4% by weight, more preferably at least about 4.5% by weight of at least one monomer having carboxylic acid functionality. Further, the monomers of the second stage include up to about 9% by weight, preferably up to about 8% by weight, more preferably up to about 7.5% by weight of the at least one monomer having carboxylic acid functionality. Preferred ranges for the monomer or monomers having carboxylic acid functionality are from about 3% to about 9% by weight, particularly from about 4% to about 8% by weight, and especially from about 4.5% to about 7.5% by weight, based on total weight of second stage monomers. When less than about 3% by weight or more than about 9% by weight of carboxylic acid-functional monomer is included in the second stage monomer combination, then the emulsion polymerization produces unacceptable amounts of coagulum and the coating composition prepared from the two-stage emulsion polymer exhibits large viscosity changes, which are undesirable for the reasons already discussed. Examples of suitable carboxylic acid-functional monomers include, without limitation, those already mentioned above in connection with the composite polymeric particles.

Preferably, the combination of addition monomers of the second stage further includes at least about 25% by weight, more preferably at least about 30% by weight, of at least one hydrophobic monomer, based on the total weight of second stage monomers having no functional group other than the polymerizable ethylenically unsaturated group. Examples of suitable hydrophobic monomers include, without limitation, those already mentioned above in connection with the first stage monomers.

The weight ratio of first stage polymer to second stage polymer may be from about 60:40 to about 90:10, preferably from about 75:25 to about 90:10.

The first and second stage monomers may be emulsion polymerized according to well-known methods. The first stage monomers are added and polymerized first in the aqueous medium, followed by addition and polymerization of the second stage monomers. The aqueous medium may contain a portion of organic solvent, but preferably less than about 5% of the aqueous medium is organic solvent, and preferably no organic solvent is included in the aqueous medium. Suitable examples of water-miscible organic solvent include, without limitation, esters, alkylene glycol ethers, alkylene glycol ether esters, lower molecular weight aliphatic alcohols, and so on. Ionic or amphoteric surfactants, such as sodium lauryl sulfate, nonionic surfactants based on polyethoxylated alcohols or polyethoxy-polyalkoxy block copolymers, polyoxyethylenenonylphenyl ethers, polyoxyethylenealkylallyl ether sulfuric acid esters, amino and alkali salts of dodecylbenzenesulfonic acid such as the dimethylethanolamine salt of dodecylbenzenesulfonic acid and sodium dodecylbenzenesulfonic acid, and sodium dioctylsulfosuccinate, are preferably included. The reactor is charged with water and a surfactant. It is preferred to charge from about 0.08% by weight to about 0.5% by weight, preferably from about 0.15% by weight to about 0.35% by weight, based on the total weight of monomers polymerized in the first and second stages, of an anionic surfactant. The combination of monomers to be polymerized in each stage may be pre-emulsified in water and 1% to 5% by weight surfactant, based on monomer weight, before being added to the reactor.

In general, polymerization of both stages of polymerization are carried out at temperatures of from about 30° C. to about 950° C., preferably from about 50° C. to about 90° C.

A suitable initiator capable of producing free radicals is used in the polymerization. Examples of suitable initiators include, without limitation, azo compounds and peroxy compounds such as azodiisobutyronitrile, 4,4-azobis(4-cyanovaleric acid), benzoyl peroxide, lauroyl peroxide, diisopropyldicarbonate, t-butyl peroxy-2-ethylhexanoate, peroxyisopivalate, persulfate initiators such as ammonium persulfate, potassium persulfate, and sodium persulfate, and alkali metal peroxydiphosphates, in some cases in combination with reducing agents such as sodium disulfite, hydrazine, hydroxylamine and catalytic amounts of accelerators such as iron, cobalt, cerium, and vanadyl salts, preferably alkali metal or ammonium peroxydisulfates. Chain transfer agents may be added, if desired, to control molecular weight. Typical chain transfer agents include, without limitation, mercaptan compounds such as alkyl mercaptans, e.g., octyl mercaptan and dodecyl mercaptan, mercaptopropionic acid, and esters of mercaptopropionic acid. When the coating composition is used as a basecoat, particularly in combination with a clearcoat, especially an aqueous clearcoat, 0.15% by weight to 1% by weight, based on total monomer weight, of octyl mercaptan or an equivalent amount of another chain transfer agent may advantageously included to control pinholing.

The coating composition further includes a crosslinker or curing agent reactive with the two-stage emulsion polymer. Useful crosslinkers include, without limitation, materials having active methylol or methylalkoxy groups, such as aminoplast crosslinking agents or phenol/formaldehyde adducts; curing agents that have isocyanate groups, particularly blocked isocyanate curing agents; curing agents that have acid groups, silane groups, and anhydride groups; and mixtures thereof. Examples of preferred curing agent compounds include, without limitation, melamine formaldehyde crosslinkers (including monomeric or polymeric melamine resin and partially or fully alkylated melamine resin), blocked or unblocked polyisocyanates (e.g., toluene diisocyanate, MDI, isophorone diisocyanate, hexamethylene diisocyanate, and isocyanurates, biurets, allophanates, or other oligomers of these, which may be blocked, for example, with alcohols or oximes), urea resins (e.g., methylol ureas such as urea formaldehyde resin, alkoxy ureas such as butylated urea formaldehyde resin), polyanhydrides (e.g., polysuccinic anhydride), and silane-functional crosslinkers (e.g., trimethoxy siloxane). Another suitable crosslinking agent is tris(alkoxy carbonylamino) triazine (available from Cytec Industries under the trademark TACT). The curing agent may be combinations of these, particularly combinations that include aminoplast crosslinking agents. Aminoplast resins such as melamine formaldehyde resins or urea formaldehyde resins are especially preferred. Combinations of tris(alkoxy carbonylamino) triazine with a melamine formaldehyde resin and/or a blocked isocyanate curing agent are likewise suitable and desirable.

The coating composition used in the practice of the invention may include a catalyst to enhance the cure reaction. For example, when aminoplast compounds, especially monomeric melamines, are used as a curing agent, a strong acid catalyst may be utilized to enhance the cure reaction. Such catalysts are well-known in the art and include, without limitation, p-toluenesulfonic acid, dinonyinaphthalene disulfonic acid, dodecylbenzenesulfonic acid, phenyl acid phosphate, monobutyl maleate, butyl phosphate, and hydroxy phosphate ester. Strong acid catalysts are often blocked, e.g. with an amine. Other catalysts that may be useful in the composition of the invention include Lewis acids, zinc salts, and tin salts.

An organic solvent, particularly a water-soluble or water-miscible organic solvent that functions as a cosolvent for other coating components, may optionally be utilized in the coating composition. Preferably, the solvent is selected from ketones, esters, and ether, particularly alkylene glycol monoalkyl ethers and the monoesters of these. Examples of useful solvents include, without limitation, methyl ethyl ketone, methyl isobutyl ketone, m-amyl acetate, ethylene glycol butyl ether acetate, propylene glycol monomethyl ether acetate, N-methylpyrrolidone, and mixtures of these.

When the coating composition of the invention is used as a basecoat, at least one pigment is included. The pigment may be any organic or inorganic compounds or colored materials, fillers, metallic or other inorganic flake materials such as pearlescent mica flake pigments or metallic flake pigments such as aluminum flake, and other materials of kind that the art normally includes in such coatings. Pigments and other insoluble particulate compounds such as fillers are usually used in the composition in an amount of 1% to 100%, based on the total solid weight of binder components (i.e., a pigment-to-binder ratio of 0.1 to 1).

Additional agents, for example surfactants, fillers (e.g., talc or barytes), stabilizers, wetting agents, rheology control agents, dispersing agents, adhesion promoters, fillers, UV absorbers, hindered amine light stabilizers, etc. may be incorporated into the coating composition. While such additives are well-known in the prior art, the amount used must be controlled to avoid adversely affecting the coating characteristics.

Coating compositions can be coated on the article by any of a number of techniques well-known in the art. These include, for example, spray coating, dip coating, roll coating, curtain coating, and the like. For automotive body panels, spray coating is preferred.

When the coating composition according to the invention is used as the basecoat of a composite basecoat-clearcoat coating, the basecoat coating is typically applied over one or more layers of primer coating, which are preferably cured before the basecoat is applied. A clearcoat composition is then applied over the basecoat, typically before the basecoat is cured in what is generally known as a "wet-on-wet" application, with the basecoat and clearcoat being cured at the same time. The clearcoat composition may any of a number of types well-known in the art, including . Polymers known in the art to be useful in clearcoat compositions include acrylics, vinyls, polyurethanes, polycarbonates, polyesters, alkyds, and polysiloxanes. Preferred polymers include acrylics and polyurethanes. Clearcoat polymers may be thermoplastic, but are preferably crosslinkable and comprise one or more type of crosslinkable functional groups. Such groups include, for example, hydroxy, isocyanate, amine, epoxy, acrylate, vinyl, silane, and acetoacetate groups. These groups may be masked or blocked in such a way so that they are unblocked and available for the crosslinking reaction under the desired curing conditions, generally elevated temperatures. Useful crosslinkable functional groups include hydroxy, epoxy, acid, anhydride, silane, and acetoacetate groups. Preferred crosslinkable functional groups include hydroxy functional groups and amino functional groups. Clearcoat compositions are preferably thermosetting and include one or more suitable crosslinkers, such as those already mentioned.

It is particularly preferred for the clearcoat composition to be a powder slurry clearcoat composition. Powder slurry clearcoat compositions are described, for example, in Sacharski et al., U.S. Pat. No. 5,965,213; Sacharski et al., U.S. Pat. No. 5,714,264; U.S. Pat. No. 5,379,947; U.S. Pat. No. 4,268,542; and copending U.S. application Ser. No. 314,404.

The coating compositions described herein are preferably subjected to conditions so as to cure the coating layers. Although various methods of curing may be used, heat-curing is preferred. Generally, heat curing is effected by exposing the coated article to elevated temperatures provided primarily by radiative heat sources. Curing temperatures will vary depending on the particular blocking groups used in the cross-linking agents, however they generally range between 90° C. and 180° C. The first compounds according to the present invention are preferably reactive even at relatively low cure temperatures. Thus, in a preferred embodiment, the cure temperature is preferably between 115° C. and 150° C., and more preferably at temperatures between 115° C. and 140° C. for a blocked acid catalyzed system. For an unblocked acid catalyzed system, the cure temperature is preferably between 80° C. and 100° C. The curing time will vary depending on the particular components used, and physical parameters such as the thickness of the layers, however, typical curing times range from 15 to 60 minutes, and preferably 15–25 minutes for blocked acid catalyzed systems and 10–20 minutes for unblocked acid catalyzed systems.

The invention is further described in the following examples. The examples are merely illustrative and do not in any way limit the scope of the invention as described and claimed. All parts are parts by weight unless otherwise noted.

EXAMPLES

Example 1

Preparation of Two-Stage Polymer Emulsion

A reactor was charged with 1225.6 parts by weight of deionized water and 8.5 parts by weight of ABEX EP 110 (anionic surfactant available from Rhodia). The water and surfactant charge was heated to 82° C. under an inert atmosphere and held at that temperature throughout the reaction. A first stirred monomer emulsion of 829 parts by weight butyl acrylate, 63.5 parts by weight hydroxyethyl methacrylate, 107.6 parts by weight styrene, 15.9 parts by weight hexanediol diacrylate, 669.1 parts by weight deionized water, 76.3 parts by weight ABEX EP 110, and 2.17 parts by weight ammonium persulfate was slowly added to the charge in the reactor. After all of the first monomer emulsion was in, an additional 26.7 parts by weight of deionized water was added as a rinse. The contents of the reactor were held for a period of time following the rinse, during which a second monomer mixture of 45.2 parts by weight styrene, 149.1 parts by weight methyl methacrylate, 38.1 parts by weight hydroxyethyl methacrylate, and 21.6 parts by weight methacrylic acid was prepared and, separately, a solution of 0.15 parts by weight of ammonium persulfate in 200 parts by weight of deionized water was prepared. The second monomer mixture and the ammonium persulfate solution were simultaneously added slowly to the reaction mixture. After the addition was complete, 39.6 grams of deionized water was added as a rinse. The reaction emulsion was held for at least an additional hour. The emulsion was then cooled to less than 40° C., and 31.3 parts by weight of deionized water and 7.3 parts by weight of aminomethylpropanol were added. The amount of coagulum was less than 0.01 % by weight of the emulsion product.

Example 2

Preparation of Two-Stage Polymer Emulsion

A reactor was charged with 1225.6 parts by weight of deionized water and 4.2 parts by weight of ABEX EP 110. The water and surfactant charge was heated to 82° C. under an inert atmosphere and held at that temperature throughout the reaction. A first stirred monomer emulsion of 829 parts by weight butyl acrylate, 63.5 parts by weight hydroxyethyl methacrylate, 107.6 parts by weight styrene, 15.9 parts by weight hexanediol diacrylate, 669.1 parts by weight deionized water, 80.6 parts by weight ABEX EP 110, and 2.17 parts by weight ammonium persulfate was slowly added to the charge in the reactor. After all of the first monomer emulsion was in, an additional 26.7 parts by weight of deionized water was added as a rinse. The contents of the reactor were held for a period of time following the rinse, during which a second monomer mixture of 45.2 parts by weight styrene, 149.1 parts by weight methyl methacrylate, 38.1 parts by weight hydroxyethyl methacrylate, and 21.6 parts by weight methacrylic acid was prepared and, separately, a solution of 0.15 parts by weight of ammonium persulfate in 200 parts by weight of deionized water was prepared. The second monomer mixture and the ammonium persulfate solution were simultaneously added slowly to the reaction mixture. After the addition was complete, 39.6 grams of deionized water was added as a rinse. The reaction emulsion was held for at least an additional hour. The emulsion was then cooled to less than 40° C., and 31.3 parts by weight of deionized water and 7.3 parts by weight of aminomethylpropanol were added. The amount of coagulum was less than 0.01 % by weight of the emulsion product.

Example 3

Preparation of Two-Stage Polymer Emulsion

A reactor was charged with 1225.6 parts by weight of deionized water. The water charge was heated to 82° C. under an inert atmosphere and held at that temperature throughout the reaction. A first stirred monomer emulsion of 829 parts by weight butyl acrylate, 63.5 parts by weight hydroxyethyl methacrylate, 107.6 parts by weight styrene, 15.9 parts by weight hexanediol diacrylate, 669.1 parts by weight deionized water, 84.8 parts by weight ABEX EP 110, and 2.17 parts by weight ammonium persulfate was slowly added to the charge in the reactor. After all of the first monomer emulsion was in, an additional 26.7 parts by weight of deionized water was added as a rinse. The contents of the reactor were held for a period of time following the rinse, during which a second monomer mixture of 45.2 parts by weight styrene, 149.1 parts by weight methyl methacrylate, 38.1 parts by weight hydroxyethyl methacrylate, and 21.6 parts by weight methacrylic acid was prepared and, separately, a solution of 0.15 parts by weight of ammonium persulfate in 200 parts by weight of deionized water was prepared. The second monomer mixture and the ammonium persulfate solution were simultaneously added slowly to the reaction mixture. After the addition was complete, 39.6 grams of deionized water was added as a rinse. The reaction emulsion was held for at least an additional hour. The emulsion was then cooled to less than 40° C., and 31.3 parts by weight of deionized water and 7.3 parts by weight of aminomethylpropanol were added. The amount of coagulum was less than 0.01 % by weight of the emulsion product.

Example 4

Preparation of Two-Stage Polymer Emulsion

A reactor was charged with 1225.6 parts by weight of deionized water and 84.8 parts by weight of ABEX EP 110. The water and surfactant charge was heated to 82° C. under an inert atmosphere and held at that temperature throughout the reaction. A first stirred monomer emulsion of 829 parts by weight butyl acrylate, 63.5 parts by weight hydroxyethyl methacrylate, 107.6 parts by weight styrene, 15.9 parts by weight hexanediol diacrylate, 669.1 parts by weight deionized water, 84.8 parts by weight ABEX EP 110, and 2.17 parts by weight ammonium persulfate was slowly added to the charge in the reactor. After all of the first monomer emulsion was in, an additional 26.7 parts by weight of deionized water was added as a rinse. The contents of the reactor were held for a period of time following the rinse, during which a second monomer mixture of 45.2 parts by weight styrene, 149.1 parts by weight methyl methacrylate, 38.1 parts by weight hydroxyethyl methacrylate, and 21.6 parts by weight methacrylic acid was prepared and, separately, a solution of 0.15 parts by weight of ammonium persulfate in 200 parts by weight of deionized water was prepared. The second monomer mixture and the ammonium persulfate solution were simultaneously added slowly to the reaction mixture. After the addition was complete, 39.6 grams of deionized water was added as a rinse. The reaction emulsion was held for at least an additional hour. The emulsion was then cooled to less than 40° C., and 31.3 parts by weight of deionized water and 7.3 parts by weight of aminomethylpropanol were added. The amount of coagulum was 0.92% by weight of the emulsion product.

Example 5

Preparation of Two-Stage Polymer Emulsion

A reactor was charged with 1058.6 parts by weight of deionized water and 6.3 parts by weight of ABEX EP 110. The water and surfactant charge was heated to 82° C. under an inert atmosphere and held at that temperature throughout the reaction, then 5 parts by weight of a 2% by weight aqueous solution of ammonium persulfate was added to the reactor. A first stirred monomer emulsion of 630.6 parts by weight butyl acrylate, 25.2 parts by weight hydroxyethyl methacrylate, 88.2 parts by weight styrene, 12.6 parts by weight hexanediol diacrylate, 556.3 parts by weight deionized water, and 67.7 parts by weight ABEX EP 110, and 95.2 parts by weight of a 2% by weight aqueous solution of ammonium persulfate was slowly added to the charge in the reactor. After all of the first monomer emulsion was in, an additional 50.4 parts by weight of deionized water was added as a rinse. The contents of the reactor were held for a period of time following the rinse, during which a second monomer mixture of 100.8 parts by weight styrene, 306.7 parts by weight methyl methacrylate, 75.6 parts by weight hydroxyethyl methacrylate, and 21.4 parts by weight methacrylic acid was prepared and, separately, a solution of 15.1 parts by weight of a 2% by weight aqueous solution of ammonium persulfate and 99 parts by weight of deionized water was prepared. The second monomer mixture and the ammonium persulfate solution were simultaneously added slowly to the reaction mixture. After the addition was complete, the reaction emulsion was held for until the reaction was complete. The emulsion was then cooled to less than 40° C., and 18.9 parts by weight of deionized water and 38.2 parts by weight of a 19% by weight aqueous solution of aminomethylpropanol were added.

Example 6

Preparation of Two-Stage Polymer Emulsion

A reactor was charged with 1058.6 parts by weight of deionized water and 6.3 parts by weight of ABEX EP 110. The water and surfactant charge was heated to 82° C. under an inert atmosphere and held at that temperature throughout the reaction, then 5 parts by weight of a 2% by weight aqueous solution of ammonium persulfate was added to the reactor. A first stirred monomer emulsion of 283.5 parts by weight butyl acrylate, 346.5 parts by weight butyl methacrylate, 25.2 parts by weight hydroxyethyl methacrylate, 88.2 parts by weight styrene, 12.6 parts by weight hexanediol diacrylate, 556.3 parts by weight deionized water, and 65.5 parts by weight ABEX EP 110, and 95.2 parts by weight of a 2% by weight aqueous solution of ammonium persulfate was slowly added to the charge in the reactor. After all of the first monomer emulsion was in, an additional 50.4 parts by weight of deionized water was added as a rinse. The contents of the reactor were held for a period of time following the rinse, during which a second monomer mixture of 100.8 parts by weight styrene, 306.7 parts by weight methyl methacrylate, 75.6 parts by weight hydroxyethyl methacrylate, and 21.4 parts by weight methacrylic acid was prepared and, separately, a solution of 15.1 parts by weight of a 2% by weight aqueous solution of ammonium persulfate and 99 parts by weight of deionized water was prepared. The second monomer mixture and the ammonium persulfate solution were simultaneously added slowly to the reaction mixture. After the addition was complete, the reaction emulsion was held for until the reaction was complete. The emulsion was then cooled to less than 40° C., and 18.9 parts by weight of deionized water and 38.2 parts by weight of a 19% by weight aqueous solution of aminomethylpropanol were added.

Example 7

Preparation of Two-Stage Polymer Emulsion

A reactor was charged with 1058.6 parts by weight of deionized water and 6.3 parts by weight of ABEX EP 110. The water and surfactant charge was heated to 82° C. under an inert atmosphere and held at that temperature throughout the reaction, then 5 parts by weight of a 2% by weight aqueous solution of ammonium persulfate was added to the reactor. A first stirred monomer emulsion of 630 parts by weight butyl methacrylate, 25.2 parts by weight hydroxyethyl methacrylate, 88.2 parts by weight styrene, 12.6 parts by weight hexanediol diacrylate, 556.3 parts by weight deionized water, and 65.5 parts by weight ABEX EP 110, and 95.2 parts by weight of a 2% by weight aqueous solution of ammonium persulfate was slowly added to the charge in the reactor. After all of the first monomer emulsion was in, an additional 50.4 parts by weight of deionized water was added as a rinse. The contents of the reactor were held for a period of time following the rinse, during which a second monomer mixture of 100.8 parts by weight styrene, 306.7 parts by weight methyl methacrylate, 75.6 parts by weight hydroxyethyl methacrylate, and 21.4 parts by weight methacrylic acid was prepared and, separately, a solution of 15.1 parts by weight of a 2% by weight aqueous solution of ammonium persulfate and 99 parts by weight of deionized water was prepared. The second monomer mixture and the ammonium persulfate solution were simultaneously added slowly to the reaction mixture. After the addition was complete, the reaction emulsion was held for until the reaction was complete. The emulsion was then cooled to less than 40° C., and 18.9 parts by weight of deionized water and 38.2 parts by weight of a 19% by weight aqueous solution of aminomethylpropanol were added.

Examples 8–11

Preparation of Silver Basecoat Coating Compositions

The two-stage polymer emulsions of Examples 1–4 were used to prepare silver basecoat coating compositions of Examples 8–11 using the following procedure.

An aluminum flake pigment dispersion was prepared by mixing together 245 parts by weight of propylene glycol n-butyl ether, 214 parts by weight of aluminum pigment paste (65% by weight nonvolatile), and 88 parts by weight of a dispersant resin (35.5% by weight nonvolatile). After forming the mixture, 116 parts by weight of hexamethylmethoxy melamine as added.

Separately, a melamine component was prepared by mixing together 3717 parts by weight of an acrylic resin (68% by weight nonvolatile, acid number of 45), and 5100 parts by weight of Cymel 1156 (commercially available from Cytec). Then 100 parts by weight of a 19% aqueous solution of 2-methyl-2-amino-propanol was added with mixing, followed by the slow addition of 8584 parts by weight of deionized water.

Each coating composition Example was then prepared by mixing together 1350 parts by weight of the two-stage polymer emulsion of the Example 1, 2, 3, or 4 (as indicated in Table 1) along with 542 parts by weight of deionized water, 26 parts by weight of an alkali-swellable thickening agent, and 20 parts by weight of a 19% aqueous solution of 2-methyl-2-aminopropanol. Agitation of this 10 mixture is continued with slow addition of 661 parts by weight of the aluminum flake pigment dispersion, 270 parts by weight of the melamine component, 77 parts by weight of PLURACOL P410 (available from BASF Corporation), 442 parts by weight of a 3.5% aqueous dispersion of an inorganic rheology control agent, and 1100 parts by weight of deionized water. The pH was then adjusted to 8.0 with a 19% aqueous solution of 2-methyl-2-aminopropanol.

Each silver basecoat coating composition Example was then tested for viscosity stability using an Ultra-Turrex homogenizer by subjecting the coating composition to the shear rate indicated in the table below for the indicated time. The viscosities were measured using a Brookfield cone and plate viscometer. The test results are given in Table 1, below.

TABLE 1

| | Example | | | | | | | | | | | |
|---|---|---|---|---|---|---|---|---|---|---|---|---|
| | 8 | | | 9 | | | 10 | | | 11 | | |
| SHEAR TIME | | | | | | Two-stage Polymer Emulsion | | | | | | |
| (hrs)/SHEAR | Example 1 | | | Example 2 | | | Example 3 | | | Example 4 | | |
| RATE | 400 1/S | 5 1/S | 1 1/S | 400 1/S | 5 1/S | 1 1/S | 400 1/S | 5 1/S | 1 1/S | 400 1/S | 5 1/S | 1 1/S |
| 0 | 76 | 789 | 2322 | 82 | 1061 | 2580 | 81 | 1194 | 3796 | 80 | 1297 | 4312 |
| 0.25 | 118 | 2027 | 7574 | 66 | 767 | 1603 | 67 | 1076 | 3427 | 64 | 1146 | 3722 |
| 0.5 | 119 | 2034 | 7739 | 64 | 697 | 1345 | 69 | 1102 | 3612 | 67 | 1194 | 3925 |
| 1 | 113 | 1964 | 7408 | 64 | 697 | 1408 | 74 | 1201 | 3962 | 70 | 1253 | 4349 |
| 2 | 110 | 2016 | 7776 | 63 | 685 | 1437 | 76 | 1216 | 4128 | 71 | 1305 | 4644 |
| 3 | 102 | 1813 | 6800 | 62 | 674 | 1511 | 74 | 1294 | 4496 | 67 | 1209 | 4294 |
| 4 | 94 | 1688 | 6228 | 58 | 674 | 1419 | 71 | 1319 | 4736 | 66 | 1213 | 4257 |
| 5 | 93 | 1614 | 6099 | 56 | 627 | 1290 | 68 | 1176 | 4165 | 67 | 1257 | 4496 |
| 6 | 93 | 1607 | 5989 | 56 | 667 | 1364 | 68 | 1283 | 4644 | 68 | 1327 | 4773 |

Examples 12–14

Preparation of Red Basecoat Coating Compositions and Composite Coatings

The two-stage polymer emulsions of Examples 5–7 were used to prepare compositions of Examples 12–14 using the following procedure.

A mica flake pigment dispersion was prepared by first mixing together 47.6 parts by weight of propylene glycol n-butyl ether, 32.4 parts by weight of mica flake pigment (90% by weight nonvolatile), and 8.9 parts by weight of a dispersant resin (35.5% by weight nonvolatile). To this mixture were added 20.4 parts by weight hexamethylmethoxy melamine and 13.6 parts by weight of PLURACOL P410 (available from BASF Corporation). The mixture is stirred an additional 15 minutes.

Red basecoat coating compositions were prepared by mixing together 213 parts by weight of the two-stage polymer emulsion of the Example 5, 6, or 7 (as indicated in Table 2) along with 93 parts by weight of deionized water, 4.5 parts by weight of an alkali-swellable thickening agent, 3 parts by weight of a 19% aqueous solution of 2-methyl-2-aminopropanol, 123 parts by weight of the mica flake pigment dispersion, 60 parts by weight of an aqueous red maroon pigment paste (20% by weight pigment, 8% by weight of a dispersant resin), 5.7 parts by weight of an aqueous violet pigment paste (23.5% by weight pigment, 4.3% by weight of a dispersant resin), 47.5 parts by weight of a melamine component prepared as described for Examples 8–11, 5.4 parts by weight of a phosphate ester resin (43% by weight nonvolatile), 77.7 parts by weight of a 3.5% aqueous dispersion of an inorganic rheology control agent, and 197 parts by weight of deionized water. The pH was then adjusted to 8.0 with a 19% aqueous solution of 2-methyl-2-aminopropanol.

The composite coatings were prepared by applying one of the red basecoat coating compositions (by spraying with air atomization in a layer sufficient for hiding over a white and black hiding chart) over a prepared steel panel (phosphate treatment, cured layers of electrocoat primer and primer surfacer). The applied basecoat coating compositions were dried for 5 minutes at 140° C. Next, a two-component urethane clearcoat coating composition (available commercially from BASF Corporation) was applied over the applied basecoat layer according to the directions of the manufacturer. The applied clearcoat layer was flashed, and then the basecoat and clearcoat layers were baked at 240° F. for 20 minutes. The cured panels were tested for chip resistance using SAE Test Method J400 (one-pint gravel, panel cooled in freezer at −20° F., Gravelometer from Q-Panel). The test results are given in Table 2, below.

TABLE 2

| EXAMPLE | 12 | 13 | 14 |
|---|---|---|---|
| Two-stage Polymer Emulsion | Example 5 | Example 6 | Example 4 |
| Gravelometer Rating | 7 | 6 | 5 |

The invention has been described in detail with reference to preferred embodiments thereof. It should be understood, however, that variations and modifications can be made within the spirit and scope of the invention.

What is claimed is:

1. A coating composition, comprising a two-stage polymer emulsion containing composite polymeric particles of a first stage polymer and a second stage polymer, wherein
   (a) the first stage polymer is prepared as an emulsion in an aqueous medium by polymerizing a first combination of addition monomers comprising
      (i) from about 0.25% to about 5% by weight, based on the total weight of monomers polymerized in the first stage, of at least one monomer having at least two polymerizable ethylenically unsaturated groups;
      (ii) from about 2.5% to about 10% by weight, based on the total weight of monomers polymerized in the first stage, of at least one monomer having hydroxyl functionality, and
      (iii) no more than about 0.5% by weight, based on the total weight of monomers polymerized in the first stage, of carboxylic acid-functional monomer; and
   (b) the second stage polymer has a theoretical glass transition temperature of at least about 50° C. and is prepared by polymerizing, in the presence of the first stage polymer emulsion, a second combination of addition monomers that is substantially free of monomers having more than one polymerizable ethylenically unsaturated group, said second combination of addition monomers comprising
      (i) from about 25% to about 50% by weight, based on the total weight of monomers polymerized in the second stage, of at least one monomer having hydroxyl functionality; and (ii) from about 3% to about 9% by weight, based on the total weight of monomers polymerized in the second stage, of at least one monomer having carboxylic acid functionality; and further wherein the composite polymeric particles have a theoretical glass transition temperature of not more than about 30° C. and from about 0.8% to about 2% by weight, based on the total weight of monomers polymerized in the first stage and second stages, of at least one monomer having carboxylic acid functionality.

2. A coating composition according to claim 1, wherein the first combination of addition monomers comprises at least about 50% by weight, based on the total weight of monomers having no functional group other than the polymerizable ethylenically unsaturated group, of at least one hydrophobic monomer.

3. A coating composition according to claim 1, wherein the second combination of addition monomers comprises at least about 25% by weight, based on the total weight of monomers in the second stage having no functional group other than the polymerizable ethylenically unsaturated group, of at least one hydrophobic monomer.

4. A coating composition according to claim 1, wherein the composite polymeric particles have a theoretical glass transition temperature of not more than about 0° C.

5. A composite coating, comprising a basecoat layer and a clearcoat layer thereon; wherein the basecoat layer is derived from a coating composition according to claim 1.

6. A composite coating according to claim 5, wherein the clearcoat composition is derived from an aqueous powder slurry clearcoat.

7. A method of preparing a coated substrate, comprising the steps of:
  (1) preparing a two-stage polymer emulsion containing composite polymeric particles of a first stage polymer and a second stage polymer, by
    (a) emulsion polymerizing the first stage polymer in an aqueous medium by polymerizing a first combination of addition monomers comprising
      (i) from about 0.25% to about 5% by weight, based on the total weight of monomers polymerized in the first stage, of at least one monomer having at least two polymerizable ethylenically unsaturated groups;
      (ii) from about 2.5% to about 10% by weight, based on the total weight of monomers polymerized in the first stage, of at least one monomer having hydroxyl functionality; and
      (iii) no more than about 0.5% by weight, based on the total weight of monomers polymerized in the first stage, of carboxylic acid-functional monomer; and
    (b) preparing the second stage polymer having a theoretical glass transition temperature of at least about 50° C. by polymerizing, in the presence of the first stage polymer emulsion, a second combination of addition monomers that is substantially free of monomers having more than one polymerizable ethylenically unsaturated group, said second combination of addition monomers comprising
      (i) from about 25% to about 50% by weight, based on the total weight of monomers polymerized in the second stage, of at least one monomer having hydroxyl functionality; and
      (ii) from about 3% to about 9% by weight, based on the total weight of monomers polymerized in the second stage, of at least one monomer having carboxylic acid functionality;

wherein the composite polymeric particles have a theoretical glass transition temperature of not more than about 30° C. and from about 0.8% to about 2% by weight, based on the total weight of monomers polymerized in the first stage and second stages, of at least one monomer having carboxylic acid functionality;
  (2) applying a layer of a colored coating composition comprising the two-stage polymer emulsion of step (1);
  (3) applying over the layer of step (2) a layer of an aqueous powder slurry clearcoat composition.

8. A method according to claim 7, further comprising a step of curing the layer of step (2) and the layer of step (3) together.

9. A method according to claim 7, wherein a chain transfer agent is used in the polymerization of the two-stage polymer emulsion.

10. A method according to claim 7, wherein the emulsion polymerization of step (1)(a) is carried out by adding the first combination of addition monomers to a reactor containing water and 0.08% by weight to 0.5% by weight, based on the total weight of monomers polymerized in step (1)(a) and step (1)(b), of a surfactant.

11. A method according to claim 10, wherein the surfactant is anionic.

12. A coating composition according to claim 1, wherein the composite polymeric particles of the emulsion polymer have a theoretical glass transition temperature of not more than about 0° C.

13. A coating composition according to claim 1, wherein the composite polymeric particles of the emulsion polymer have a theoretical glass transition temperature of from about −25° C. to about 0° C.

14. A coating composition according to claim 1, wherein the composite polymeric particles of the emulsion polymer have from about 1% by weight to about 1.5% by weight of the at least one monomer having carboxylic acid functionality, based on the total weight of monomers polymerized in the first stage and second stages.

15. A coating composition according to claim 1, wherein the first combination of addition monomers includes from about 0.5% to about 3.5% by weight, based on the total weight of monomers polymerized in the first stage, of the at least one monomer having at least two polymerizable ethylenically unsaturated groups.

16. A coating composition according to claim 1, wherein the first combination of addition monomers includes from about 4% to about 7% by weight, based on the total weight of monomers polymerized in the first stage, of the at least one monomer having hydroxyl functionality.

17. A coating composition according to claim 1, wherein the second stage polymer has a theoretical glass transition temperature of at least about 75° C.

18. A coating composition according to claim 1, wherein the second combination of addition monomers comprises from about 30% to about 45% by weight, based on the total weight of monomers polymerized in the second stage, of the at least one monomer having hydroxyl functionality.

19. A coating composition according to claim 1, wherein the second combination of addition monomers comprises from about 4.5% to about 7.5% by weight, based on the total weight of monomers polymerized in the second stage, of the at least one monomer having carboxylic acid functionality.

20. A coating composition according to claim 1, wherein the weight ratio of the first stage polymer to the second stage polymer is from about 60:40 to about 90:10.

21. A coating composition according to claim 1, wherein the weight ratio of the first stage polymer to the second stage polymer is from about 75:25 to about 90:10.

* * * * *